United States Patent
Nagase

(10) Patent No.: US 8,020,736 B2
(45) Date of Patent: Sep. 20, 2011

(54) SPARE TIRE COVER SUPPORTING STRUCTURE

(75) Inventor: Takeshi Nagase, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 429 days.

(21) Appl. No.: 11/861,067

(22) Filed: Sep. 25, 2007

(65) Prior Publication Data

US 2008/0073389 A1    Mar. 27, 2008

(30) Foreign Application Priority Data

Sep. 25, 2006  (JP) ................ P2006-259542

(51) Int. Cl.
*B62D 43/02*  (2006.01)
(52) U.S. Cl. ................................................. 224/42.2
(58) Field of Classification Search ........... 224/42.12, 224/42.2, 42.21, 42.25; 296/37.2; 414/463, 414/465, 466; 292/DIG. 6
See application file for complete search history.

(56) References Cited

U.S. PATENT DOCUMENTS

| | | | | |
|---|---|---|---|---|
| 2,526,539 A | * | 10/1950 | Carroll | 292/17 |
| 2,698,118 A | * | 12/1954 | Dickason | 224/42.21 |
| 3,061,346 A | * | 10/1962 | Jorgensen | 292/17 |
| 3,326,434 A | * | 6/1967 | Cheadle | 224/42.21 |
| 4,817,834 A | * | 4/1989 | Weiler | 224/509 |
| 5,333,766 A | * | 8/1994 | Fisher | 224/42.21 |
| 5,564,611 A | * | 10/1996 | Weiler | 224/502 |
| 5,746,456 A | * | 5/1998 | Violi et al. | 292/146 |
| 6,477,798 B1 | | 11/2002 | Giesey et al. | |
| 6,954,992 B2 | * | 10/2005 | Hwang | 34/108 |
| 7,299,809 B2 | * | 11/2007 | Kang | 134/57 DL |

FOREIGN PATENT DOCUMENTS

| | | | |
|---|---|---|---|
| JP | 09058534 A | * | 3/1997 |
| JP | 11-192900 A | | 7/1999 |
| JP | 2000-247237 A | | 9/2000 |
| JP | 2001071951 A | * | 3/2001 |

* cited by examiner

*Primary Examiner* — Justin M Larson
(74) *Attorney, Agent, or Firm* — Birch, Stewart, Kolasch & Birch, LLP

(57) ABSTRACT

A spare tire cover supporting structure includes: a transverse rear door, provided on a vehicle; a spare tire cover, including a first end and a second end, the first end supported on the transverse rear door, the spare tire cover operable to cover a spare tire held on the transverse rear door; a mounting member, detachably mounting the second end on the transverse rear door; and a supporting member, provided on one of the transverse rear door and the second end of the spare tire cover. When the second end of the spare tire cover is mounted on the transverse rear door by the mounting member or the second end of the spare tire cover is detached from the transverse rear door, the supporting member positions the spare tire cover relative to the transverse rear door and restricts an opening movement of the spare tire cover.

7 Claims, 11 Drawing Sheets

FRONT ← → REAR

FRONT ← → REAR

SPARE TIRE COVER SUPPORTING STRUCTURE

BACKGROUND OF THE INVENTION

1. Field of the Invention

The present invention relates to a spare tire cover supporting structure.

2. Description of the Related Art

For example, in vehicles such as multipurpose four-wheel drive vehicles, there are some models in which an emergency spare tire is installed on an outer surface of a transverse rear door (tailgate door) in an exposed state with a view to not only improving the external appearance of the vehicle but also effectively making use of a space within a passenger compartment thereof. In addition, in those models, there are some vehicles in which the spare tire installed in the exposed state is covered with a spare tire cover such as a soft cover or a cover made of resin with a view to realizing a further improvement in external appearance and protection of the tire against theft.

In addition, in the vehicles provided with the spare tire cover, one end side of the spare tire cover is rotatably supported on the transverse rear door via rotary units such as hinges, while the other end side thereof is detachably supported by employing a lock mechanism including bolts and nuts. Consequently, the spare tire cover can be removed by operating the lock mechanism, thereby making it possible to facilitate the attachment and detachment of the spare tire.

The related spare tire cover supporting structure like this is disclosed in, for example, JP-A-11-192900.

With the related spare tire cover supporting structure described above, however, when the locking of the spare tire cover is released, the other end of the spare tire cover falls by the weight of the spare tire cover. As a result, it becomes difficult to position the bolts and the nuts of the lock mechanism when locking the spare tire cover, and this has resulted in a fear that the workability is deteriorated.

In addition, being different from the related structure described above in which the spare tire cover is rotated vertically, in a tire cover supporting structure in which a spare tire cover is rotated in a transverse direction of the vehicle, furthermore, when locking of the spare tire cover is released, the spare tire cover naturally rotates outwards from the weight of the spare tire cover at the same time that bolts of the lock mechanism are removed from corresponding nuts.

In recent years, in vehicles provided with spare tire covers, there are some vehicles in which a license plate is installed on an outer surface of the spare tire cover, and in conjunction with this, the installation of a license plate lamp for illuminating the license plate in the dark on the spare tire cover has been in increase. Furthermore, since the spare tire cover is disposed at a rear end of the vehicle, there is a case where electrical equipment such as a rearview monitor and a rear fog lamp is selectively mounted as an option. Consequently, the weight of the spare tire cover varies depending on the option selected, and hence, the falling amount of the other end of the spare time cover also becomes inconsistent. As is understood from these facts, it is considered that the weight of spare tire covers will be increased more and more in the future and the falling amount at the other end of the spare tire cover varies vehicle from vehicle.

SUMMARY OF THE INVENTION

It is therefore an object of the invention to provide a spare tire cover supporting structure which can realize an increase in workability and prevention of danger that would otherwise be produced.

In order to achieve the object, according to the invention, there is provided a spare tire cover supporting structure comprising:

a transverse rear door, provided on a vehicle;

a spare tire cover, including a first end and a second end, the first end supported on the transverse rear door, the spare tire cover operable to cover a spare tire held on the transverse rear door;

a mounting member, detachably mounting the second end on the transverse rear door; and a supporting member, provided on one of the transverse rear door and the second end of the spare tire cover, wherein when the second end of the spare tire cover is mounted on the transverse rear door by the mounting member or the second end of the spare tire cover is detached from the transverse rear door, the supporting member positions the spare tire cover relative to the transverse rear door and restricts an opening movement of the spare tire cover.

An engagement portion adapted to be brought into engagement with the supporting member may be provided on the other of the transverse rear door and the second end of the spare tire cover. The supporting member may include: a guide portion, including a slope for guiding the engagement portion; and a projecting portion, projecting in a first direction which is perpendicular to a direction of the opening movement of the spare tire cover.

The engagement portion may include a bent piece which is formed by bending a surface of the other of the transverse rear door and the second end of the spare tire cover, and the bent piece may have a first angle relative to the first direction. The projecting portion may include an inclined portion which can be brought into abutment with the bent piece, and the included portion may have a second angle relative to the first direction. The first angle may be smaller than the second angle.

The mounting member may lock the second end of the spare tire cover on the transverse rear door. When locking by the mounting member is released, the projecting portion may restrict the opening movement of the spare tire cover.

DETAIL DESCRIPTION OF THE INVENTION

Hereinafter, a spare tire supporting structure of the invention will be described in detail by employing the accompanying drawings.

Figure 1:
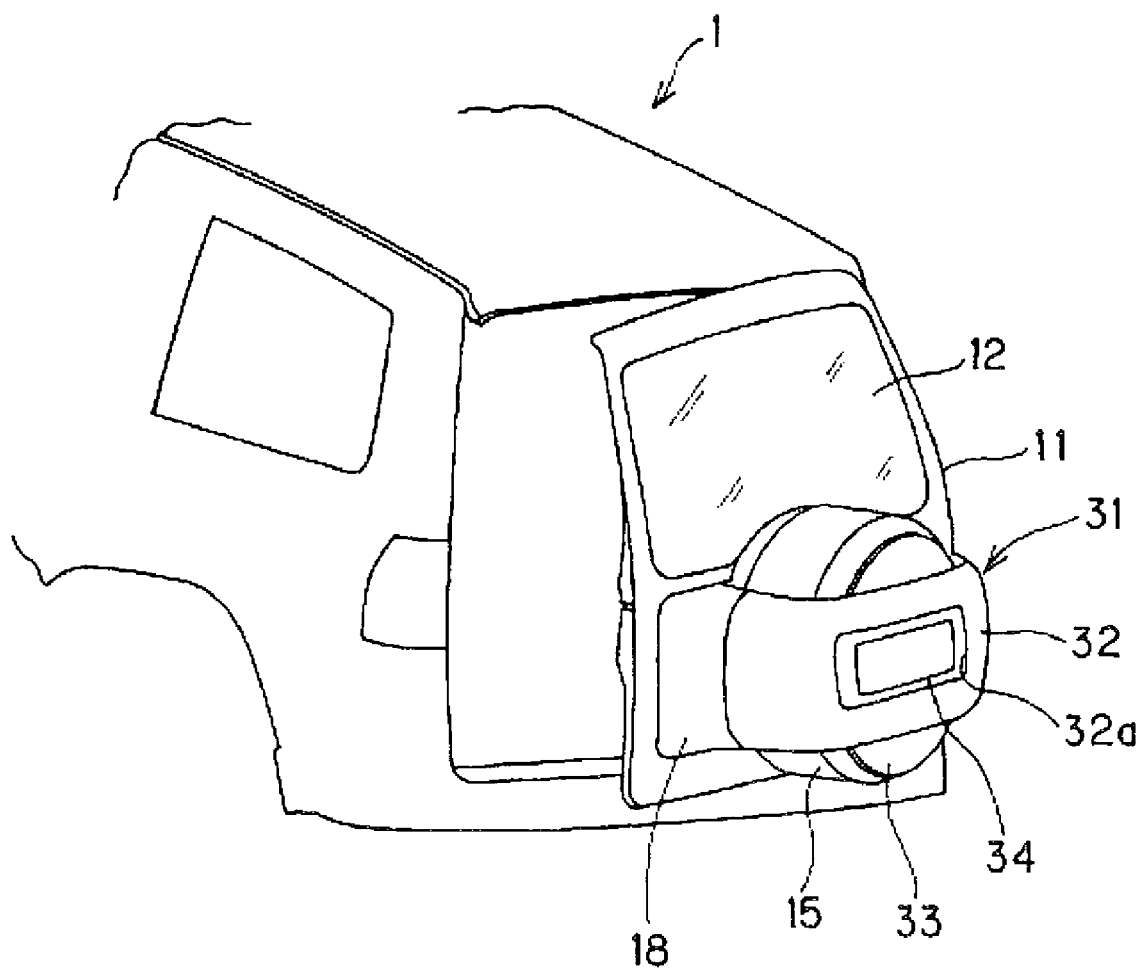
FIG. 1 is a rear perspective view of a vehicle provided with a spare tire cover supporting structure according to one embodiment of the invention.
Figure 2:
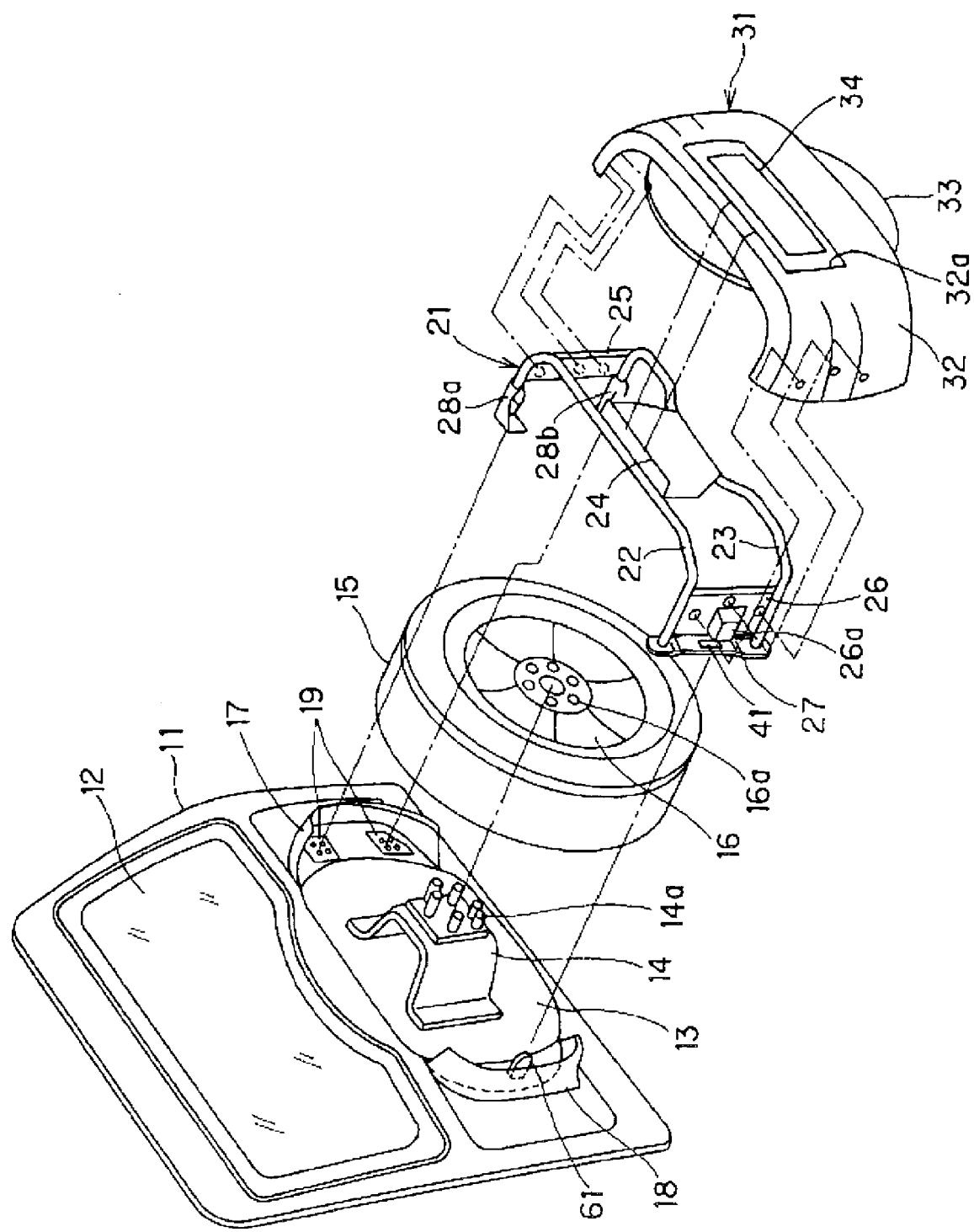
FIG. 2 is an exploded rear perspective view of the spare tire cover supporting structure.
Figure 3:
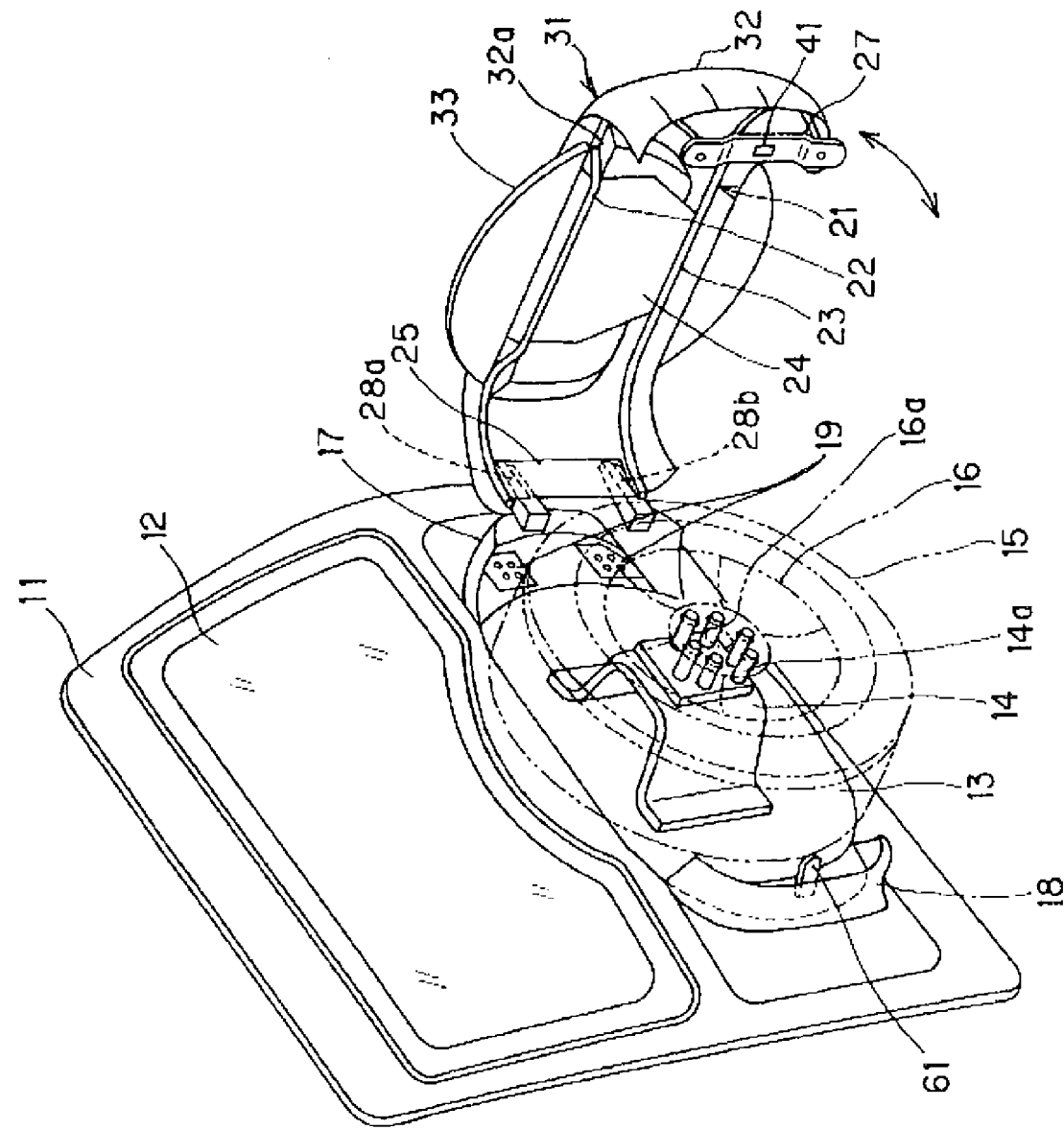
FIG. 3 is a rear perspective view showing a condition in which a spare tire cover is in an open state.

As is shown in FIGS. 1 to 3, a transverse rear door 11 is provided rotatably on a rear end face of a vehicle 1 via transverse rear door hinges, not shown. A transverse rear door glass 12 is fitted in an upper portion of the transverse rear door 11, while a circular spare tire mounting surface 13 is formed below the transverse rear door glass 12 in a substantially central portion on the transverse rear door 11 in a transverse direction of the vehicle. In addition, a bracket 14, which is formed into a raised shape, is formed in a substantially central portion of the spare tire mounting surface 13, so that a spare tire 15 is mounted on the bracket 14.

A wheel 16 is fitted in the spare tire 15, and a plurality of hub bolt holes 16a are formed in this wheel 16. On the other hand, a plurality of mounting bolts 14a are provided on a top surface portion of the raised bracket 14 in such a manner as to correspond to the hub bolt holes 16a, respectively. Namely, with an outer surface of the wheel 16 oriented towards the rear of the vehicle, the mounting bolts 14a and the hub bolt holes 16a are disposed in such a manner as to face each other, and mounting nuts, not shown, are mounted on the mounting bolts 14a which have now passed through the hub bolt holes 16a, whereby the spare tire 15 can be fixed on to the bracket 14.

Door-side covers 17, 18, which are made of resin, are provided on both sides of the spare tire mounting surface 13 in the transverse direction. In addition, mounting seats 19 are formed on the spare tire mounting surface 13 inside of the door-side cover 17 in the transverse direction, while a holder 61, which will be described later, is provided on the spare tire mounting surface 13 inside of the door-side cover 18 in the transverse direction.

A spare tire cover supporting body 21 is provided on an outer side of the spare tire 15. The spare tire cover supporting body 21 includes frames 22, 23, which make up a framework, reinforcement members 24, 25, 26 which reinforce the frames 22, 23 and a mounting plate 27.

The frames 22, 23 are provided in parallel in a vertical direction and are provided in such a manner as to surround the spare tire 15 in a horizontal direction. In addition, substantially intermediate portions in a longitudinal direction of the frames 22, 23 are coupled to each other by the reinforcement member 24, while the frames 22, 23 are coupled to each other by the reinforcement 25 at one ends thereof and by the reinforcement member 26 at the other ends thereof (left ends as viewed from the rear of the vehicle). Furthermore, distal ends of the frames 22, 23 at the other ends thereof are coupled to each other by the mounting plate 27. Note that in this embodiment, the reinforcement members 24, 25, 26 and the mounting plate 27 are such as to be pressed into plate shapes from a sheet steel.

Additionally, a pair of upper and lower hinges 28a, 28b are supported, respectively, at an upper end and a lower end of the reinforcement member 25, which lies on the right-hand side as viewed from the rear of the vehicle, at distal ends thereof, and proximal ends of the respective hinges 28a, 28b are mounted on the mounting seats 19, respectively. On the other hand, a swelling portion 26a is formed on the reinforcement member 26, which lies on the left-hand side as viewed from the rear of the vehicle, in such a manner as to swell outwards in the transverse direction and to be opened on a side facing the front of the vehicle.

A spare tire cover 31 made of resin is provided on an outer side of the spare tire cover supporting body 21. The spare tire cover 34 includes a cover main body 32 and a circular portion 33 which is formed integrally on the cover main body 32. The cover main body 32 takes a rectangular shape and is formed in such a manner that both transverse ends thereof are bent towards the front of the vehicle. In addition, the circular portion 33 is formed into a circular shape which is diametrically slightly smaller than the spare tire 15. Namely, the spare tire cover 31 holds the spare tire 15 mounted from both sides thereof and covers the spare tire 15 in such a manner as to conceal the wheel 16. In addition, a recessed portion 32a is formed on an outer surface of the cover main body 32, and a license plate 34 is provided in this recessed portion 32a.

Next, a spare tire supporting structure will be described by employing FIGS. 4 to 6.

Figure 5:
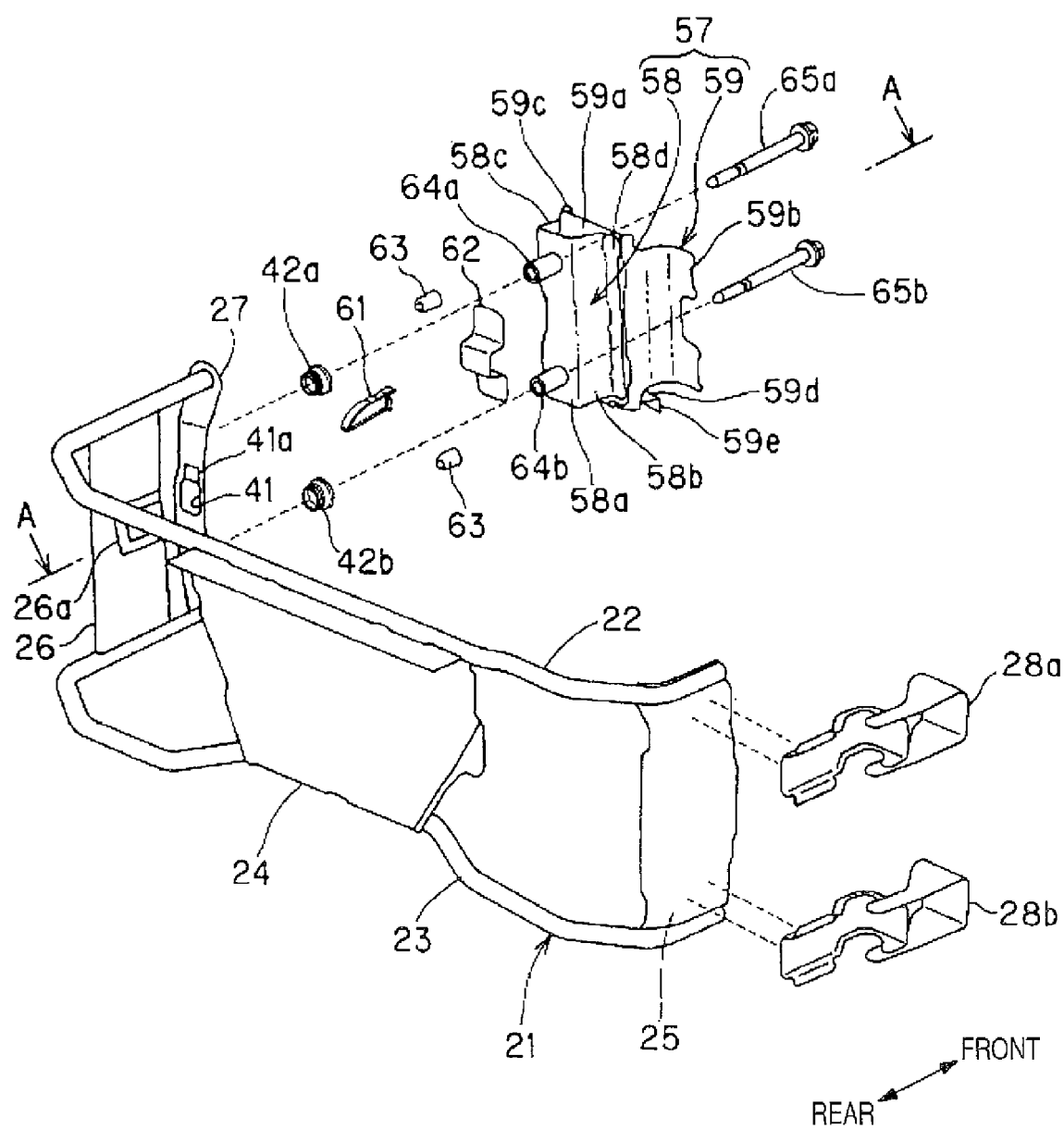
FIG. 5 is an exploded perspective view of the spare tire cover supporting structure according to the embodiment of the invention.
Figure 6:
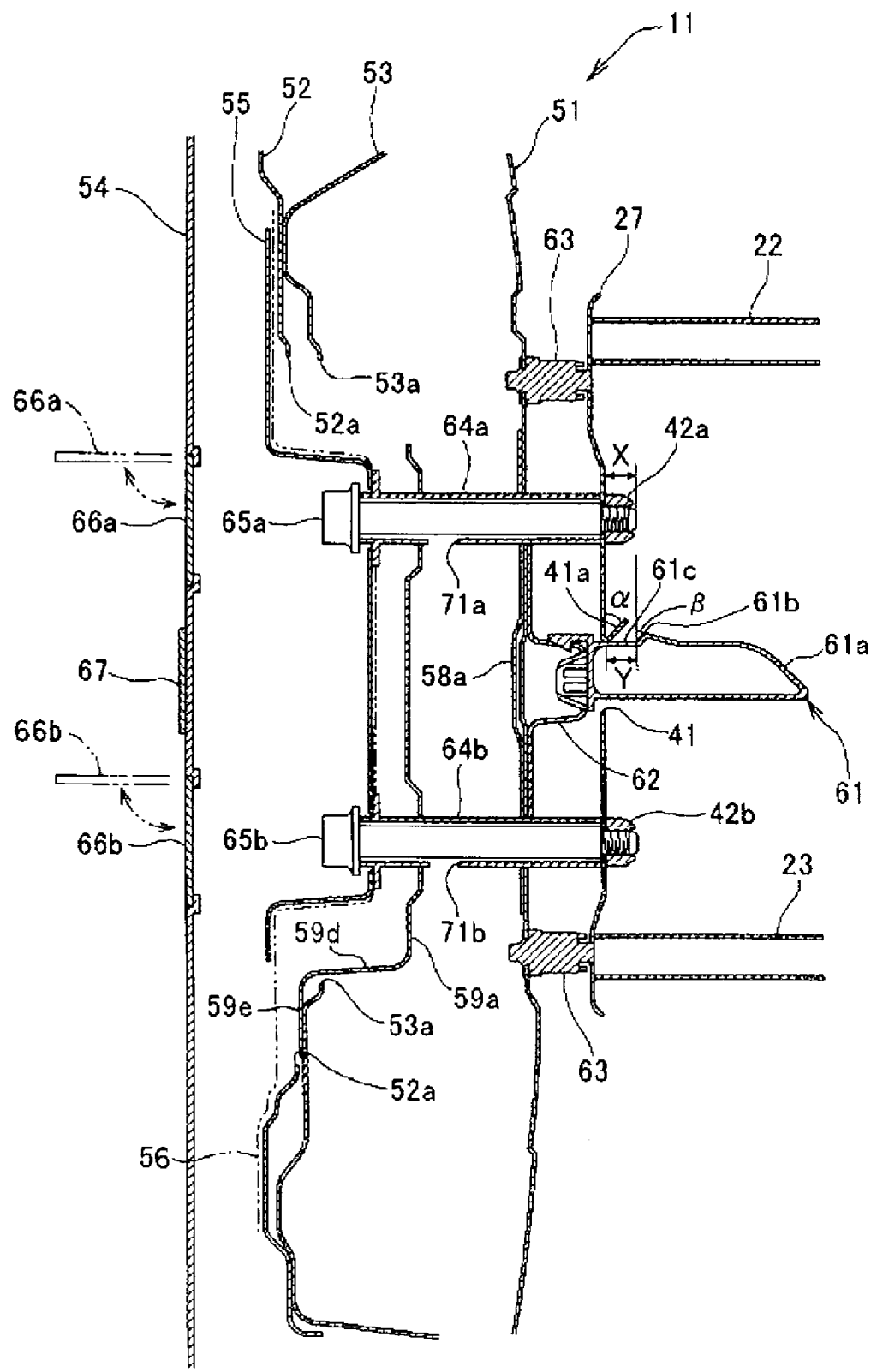
FIG. 6 is a sectional view taken along the line A-A and viewed in a direction indicated by arrows A in FIG. 5.

As is shown in FIGS. 5, 6, an engagement hole 41 is formed on the mounting plate 27 of the spare tire cover supporting body 21 in such a manner as to open in a substantially intermediate portion in a longitudinal direction thereof, and a bent piece 41a which is bent towards the rear of the vehicle is formed at an upper end of the engagement hole 41. In addition, the bent portion 41a of the engagement hole 41 forms an angle α relative to a surface direction (a vertical direction) of the mounting plate 27. In addition, nuts 42a, 42b are provided integrally with the mounting plate 27 above and below the engagement hole 41 in the mounting plate 27, respectively.

On the other hand, the transverse rear door 11 includes an outer panel 51, an inner panel 52, which is disposed further inwards than the outer panel 51, a reinforcement 53, which is joined to an outer surface of the inner panel 52 so as to reinforce the inner panel 52, and a door trim 54, which is disposed further inwards than the inner panel 52.

A bracket 62, which is formed into a raised shape, is mounted on an outer surface of the outer panel 51, and the holder 61 is supported on a top surface portion of the bracket 62. The holder 61 is formed into a knife shape and has, on an upper surface thereof, a slope portion 61a which slopes moderately as it extends towards its distal end, a raised portion 61b which projects upwards (in a direction which is vertical to a direction in which the spare tire 31 and the spare tire cover supporting body 21 are operated to be opened and closed) in a position lying further proximal than the slope portion 61a, and a planar portion 61c which is formed in a position lying further proximal than the raised portion 61b.

Here, a restricting inclination angle which is formed by an inclined surface of the raised portion 61b of the holder 61 which lies on a proximal side of the raised portion 61b and a perpendicular drawn relative to the holder 61 forms an angle β, and a relationship of $\alpha \leq \beta$ is established between the aforesaid bent-back angle α and the restricting inclination angle β. In addition, the planar portion 61c of the holder 61 is formed to extend over a length Y from a proximal end of the raised portion 61c.

In addition, the holder 61 is passed through the engagement hole 41 in the mounting plate 27 on the spare tire cover supporting body 21 side in such a state that the spare tire cover is closed, and an upper edge portion of the engagement hole 41, which is a bent portion of the bent piece 41a, is brought into abutment with the upper surface of the holder 61. In addition, dampers 63, which are formed of rubber or the like, are provided, respectively, above and below the holder 61 on the outer panel 51.

Working holes 52a, 53a are formed in the inner panel 52 and the reinforcement 53, respectively. These working holes 52a, 53a are holes which are used, for example, when mounting a door latch or the like inside the transverse rear door 11. A support plate 55 is disposed inwards of the working holes 52a, 53a, and this support plate 55 is joined to an inner surface of the inner panel 52 via a waterproof film 56. Namely, the waterproof film 56 is affixed thereto in such a manner as to cover the working holes 52a, 53a from the inside. In addition, a supporting body 57 having a closed cross-sectional construction is disposed within the working hole 53a in such a manner as to face the holder 61, and this supporting body 57 includes an outer bracket 58 and an inner bracket 59 whose cross sections take groove shapes.

The outer bracket 58 includes a top surface portion 58a, side walls 58b, 58c, which connect to the top surface portion 58a, and a flange portion 58d, which is formed along a distal end of the side wall 58b. On the other hand, the inner bracket 59 includes a top surface portion 59a, a curved wall 59b, which connects to the top surface portion 59a, a side wall 59c, a lower wall 59d and a flange portion 59e, which is formed along a distal end of the lower wall 59d.

The outer bracket 58 and the inner bracket 59 are integrated with each other by connecting together the flange portion 58a of the outer bracket 58 and the top surface portion 59a of the inner bracket 59 and joining together the side wall 58c of the outer bracket 58 and the side wall 59c of the inner bracket 59. Namely, since the outer bracket 58 and the inner bracket 59 are joined together in such a manner that the opening of the outer bracket 58 is covered by the top surface portion 59a of the inner bracket 59, the supporting body 57 is allowed to have the closed cross sectional construction, the rigidity thereof being thereby increased.

Furthermore, the supporting body 57, which is joined in the way described above, is joined between the outer panel 51 and the reinforcement 53 through the connection of the top surface portion 58a of the outer bracket 58 with the holder 61 via the outer panel 59 and the bracket 62 and connection of the curved wall 59b and the flange portion 59e of the inner bracket 59 with the reinforcement 53.

Pipes 64a, 64b are supported between the outer panel 51, the supporting plate 55, the waterproof film 56, the top surface portion 58a of the outer bracket 58 and the top surface portion 59a of the inner bracket 59 in such a manner as to pass therethrough. The pipes 64a, 64b are provided in such a manner as to face the nuts 42a, 42b, respectively. Bolts 65a, 65b are passed through interiors of the pipes 64a, 64b, respectively, so that externally threaded portions of the bolts 65a, 65b are fittingly screwed into internally threaded portions in the nuts 42a, 42b, respectively, whereby the spare tire cover supporting body 21 is supported on the transverse rear door 11 side. Namely, the nuts 42a, 42b, the pipes 64a, 64b and the bolts 65a, 65h make up the lock mechanism. Here, a length X over which the bolts 65a, 65b project from distal ends of the pipes 64a, 64b when the bolts 65a, 65b lying in the pipes 64a, 64b are fittingly screwed into the nuts 42a, 42b, respectively, is made to be substantially the same length as the length Y of the planar portion 61c of the holder 61.

In addition, discharge holes 71a, 71b are formed in the pipes 64a, 64b, respectively, in such a manner as to open downwards. The discharge holes 71a, 71b are disposed in positions on the pipes 64a, 64b which lie between the outer panel 51 and the inner panel 52, that is, further outwards than the waterproof film 56.

Figure 4:
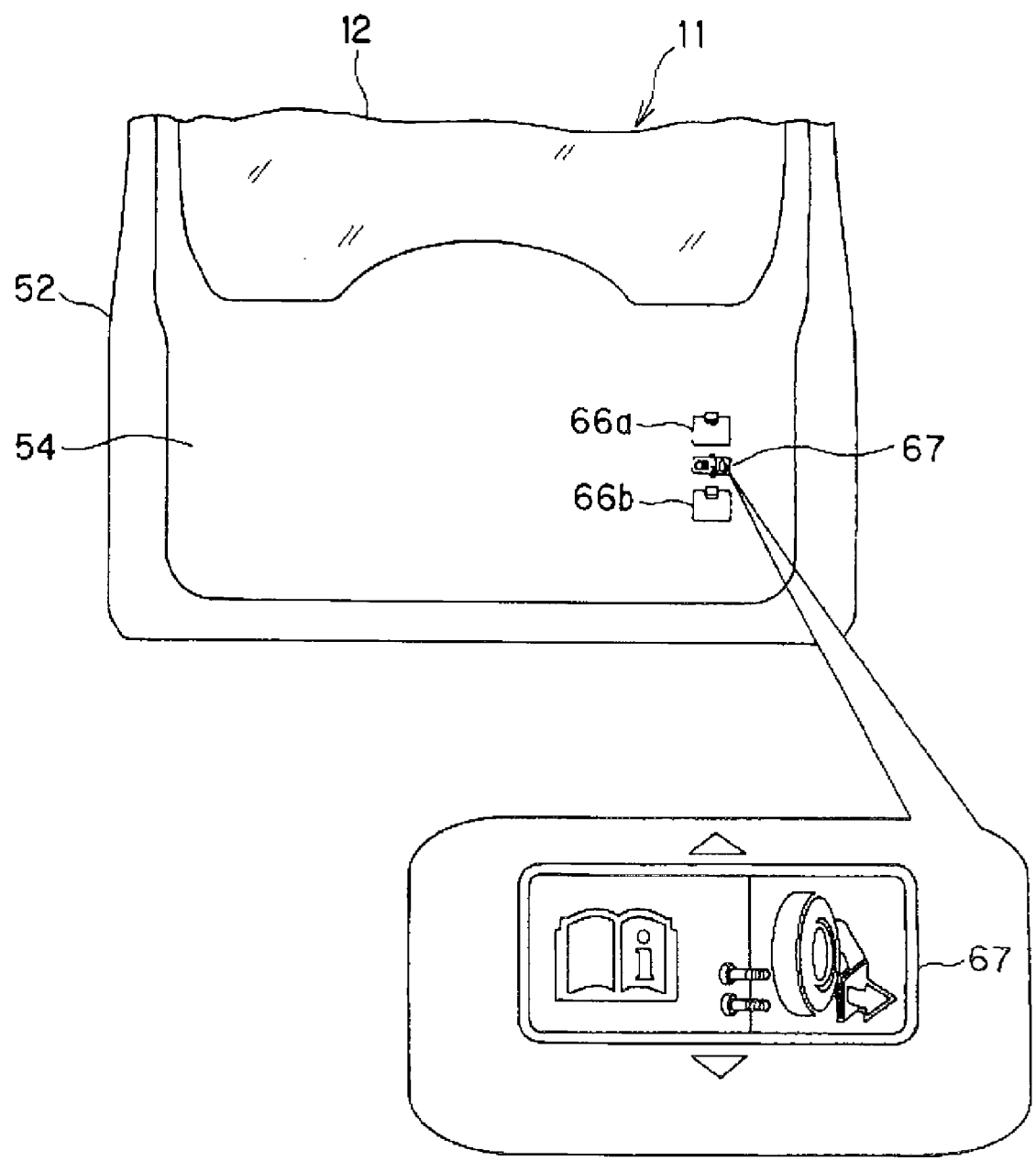
FIG. 4 is an explanatory drawing showing an inner surface of a transverse rear door.

As is shown in FIGS. 4, 6, lids 66a, 66b are mounted on the door trim 54 in positions which face the pipes 64a, 64b, respectively, in such a manner as to be able to approach the bolts 65a, 65b, respectively. An indication plate 67 is provided between the lids 66a, 66b, and this indication plate 67 indicates thereon graphics of the spare tire 15, the spare tire cover 31 and the bolts 65a, 65b.

Consequently, by configuring the spare tire supporting structure in the way that has been described heretofore, the spare tire cover 31, which is integrated with the spare tire cover supporting body 21, is opened and closed relative to the spare tire 15 which is mounted on the transverse rear door 11 by rotating the spare tire cover supporting body 21 in the transverse direction. Then, the spare tire 15 can be mounted or dismounted in such a state that the spare tire cover is opened. The opening and closing operations of the spare tire cover 31 are carried out in such a manner that the bolts 65a, 65b are loosened to be removed from the nuts 42a, 42b, respectively, so as to unlock the spare tire cover 31, whereby the spare tire cover is put into an open state, the spare tire cover 31 is locked to be put into a closed state by tightening the bolts 65a, 65b into the nuts 42a, 42b, respectively.

Next, a detaching operation for detaching a rotational end of the spare tire cover 31 from the transverse rear door 11 will be described by employing FIGS. 6 to 10.

Figure 7:
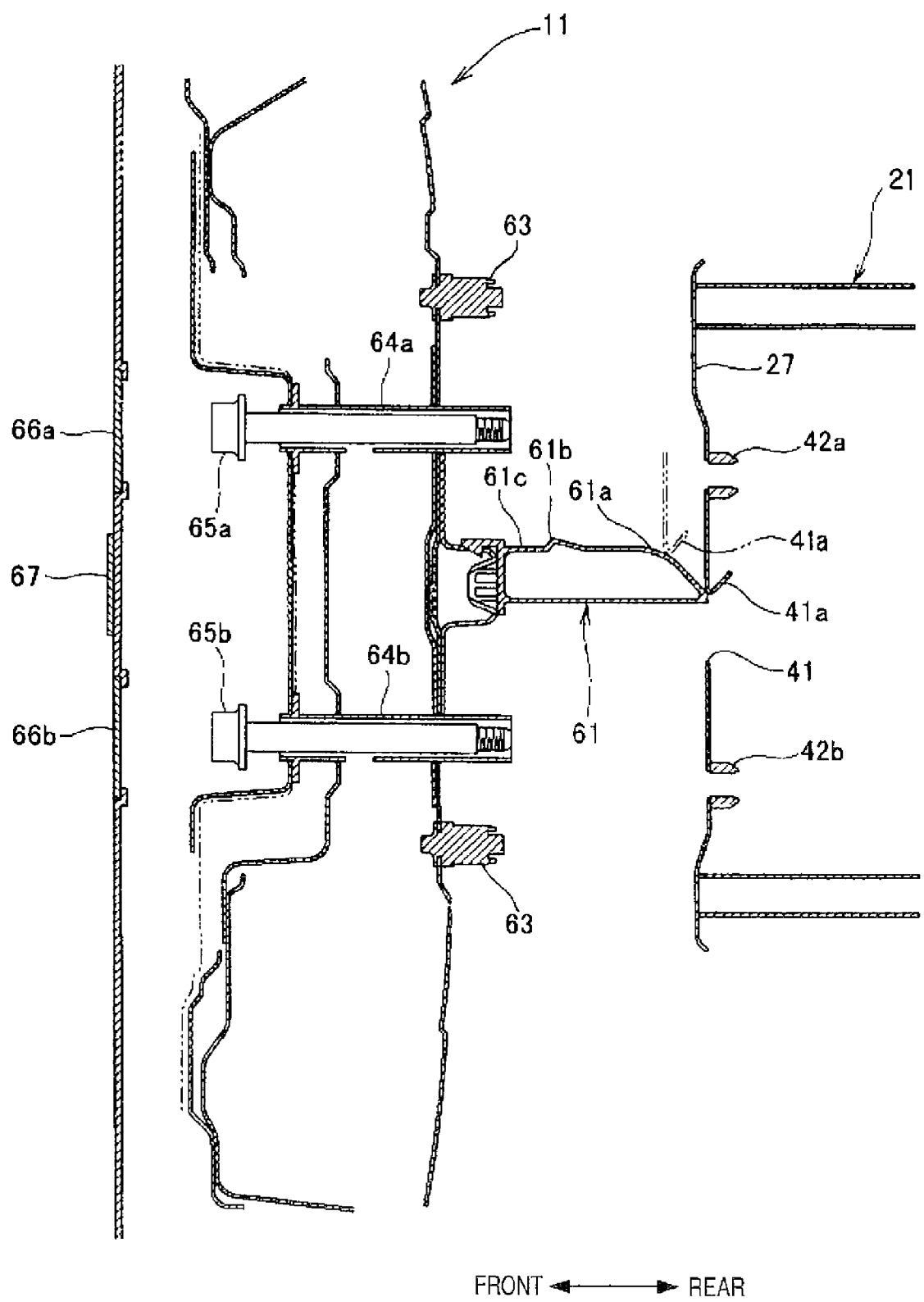
FIG. 7 is a sectional view showing a state in which an engagement portion moves along a slope portion during a closing movement.

Firstly, when mounting the rotational end of the spare tire cover 31 on the transverse rear door 11, as is shown in FIG. 7, the spare tire cover supporting body 21 is operated to be closed. As this occurs, since weights of the spare tire cover 31, the license plate 34 and electrical equipment (for example, a license plate lamp, a rearview monitor, a rear fog lamp and the like) are applied to the spare tire cover supporting body 21 in addition to its own weight, a rotational end (the other end) side of the spare tire cover supporting body 21 falls, resulting in a state that the spare tire cover 31 is inclined. When the spare tire cover supporting body 21 is rotated in this state, the upper edge portion of the engagement hole 41 is brought into abutment with the distal end of the slope portion 61a of the holder 61.

Figure 8:
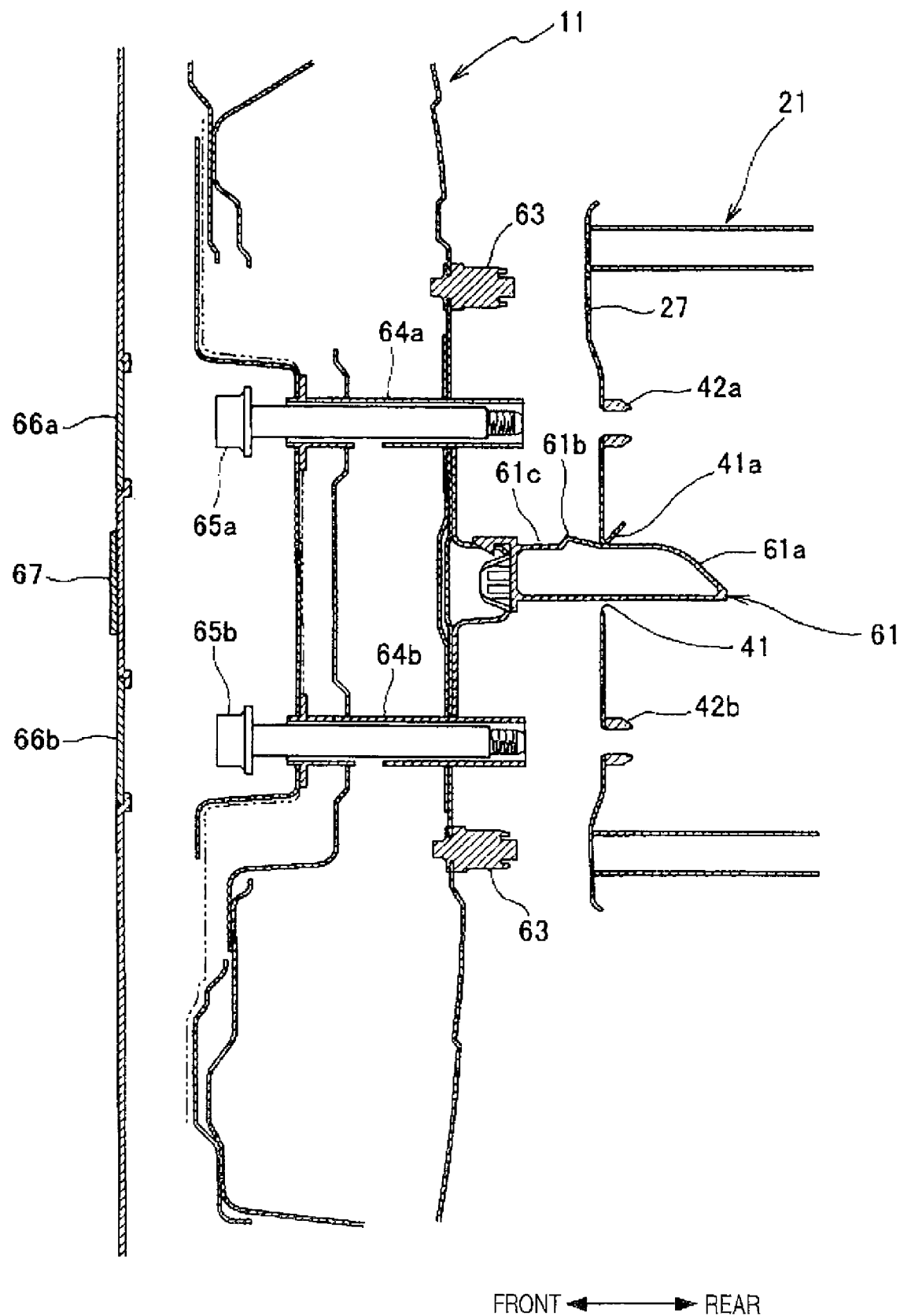
FIG. 8 is a sectional view showing a state in which the engagement portion moves to an apex of the slope portion during the closing movement.

When the spare tire cover supporting body 21 is rotated further, the engagement hole 41 ascends along the slope portion of the holder 61, as is shown by chain double-dashed lines in FIG. 7. Then, as is shown in FIG. 8, when the upper edge portion of the engagement hole 41 reaches an apex of the slope portion 61a of the holder, the rotational end side of the spare tire cover supporting body 21 also ascends, whereby the spare tire cover supporting body 21 comes to be held in a substantially horizontal state, the inclination of the spare tire cover 31 being thereby modified.

Figure 9:
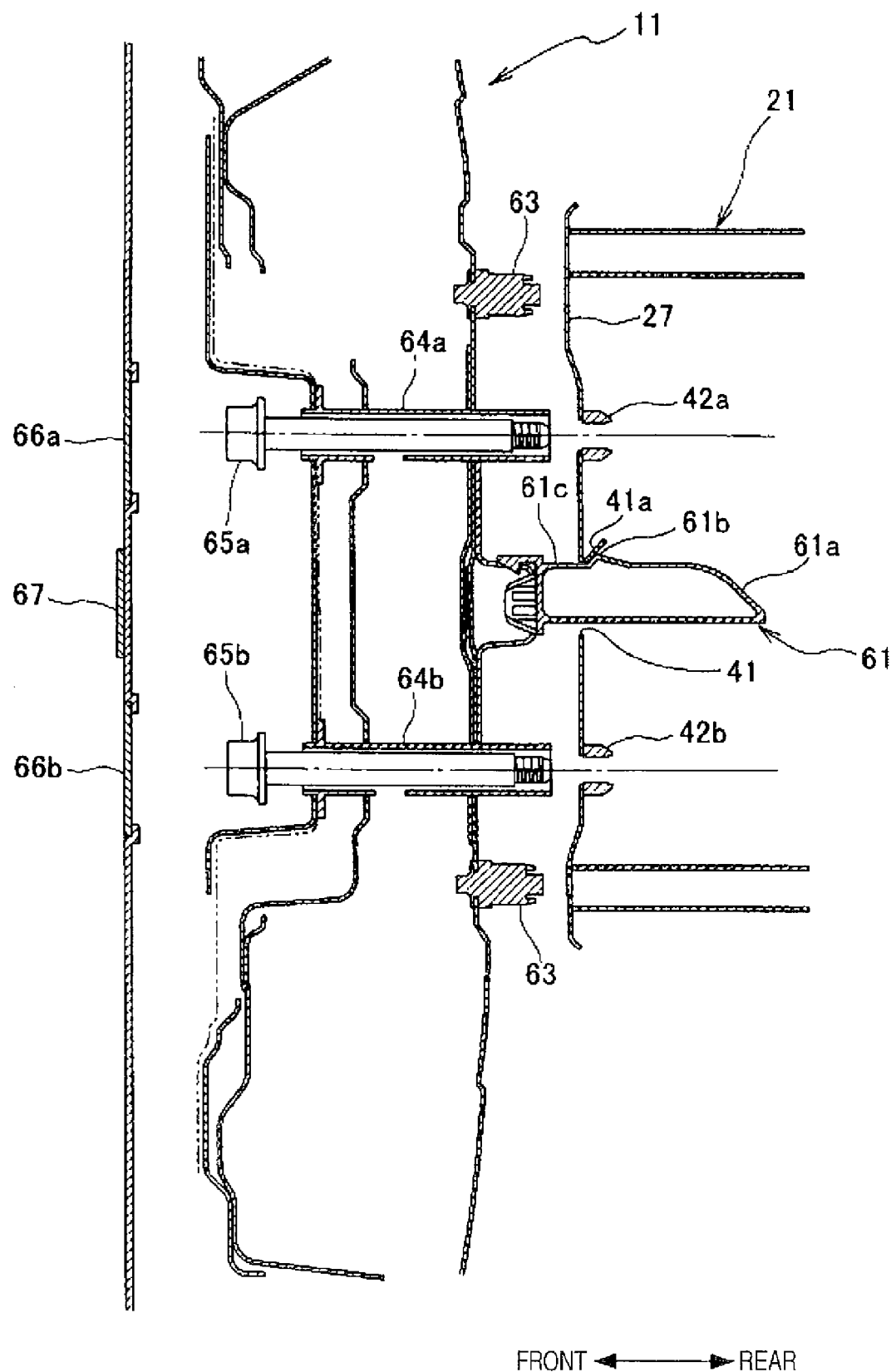
FIG. 9 is a sectional view showing a state in which the engagement portion rides over a raised portion during the closing movement.

In addition, when the spare tire cover supporting body 21 is rotated further, the upper edge portion of the engagement holder 41 rides over the raised portion 61b of the holder 61 to eventually arrive at the planar portion 61c, as is shown in FIG. 9. As this occurs, the bent piece 41a comes into abutment with a surface of the raised portion 61b which lies on the proximal end side of the holder 61, whereby, the rotation of the spare tire cover supporting body 21 in the opening direction is restricted, and the upper edge portion of the engagement hole 41 is temporarily held on the planar portion 61c of the holder 61. In addition, when the upper edge portion of the engagement hole 41 moves on to the planar portion 61c of the holder 61, the nuts 42a, 42b and the pipes 64a, 64b are axially aligned (positioned) with each other, respectively, whereby the nuts 42a, 42b and the pipes 64a, 64b are disposed coaxially.

Figure 10:
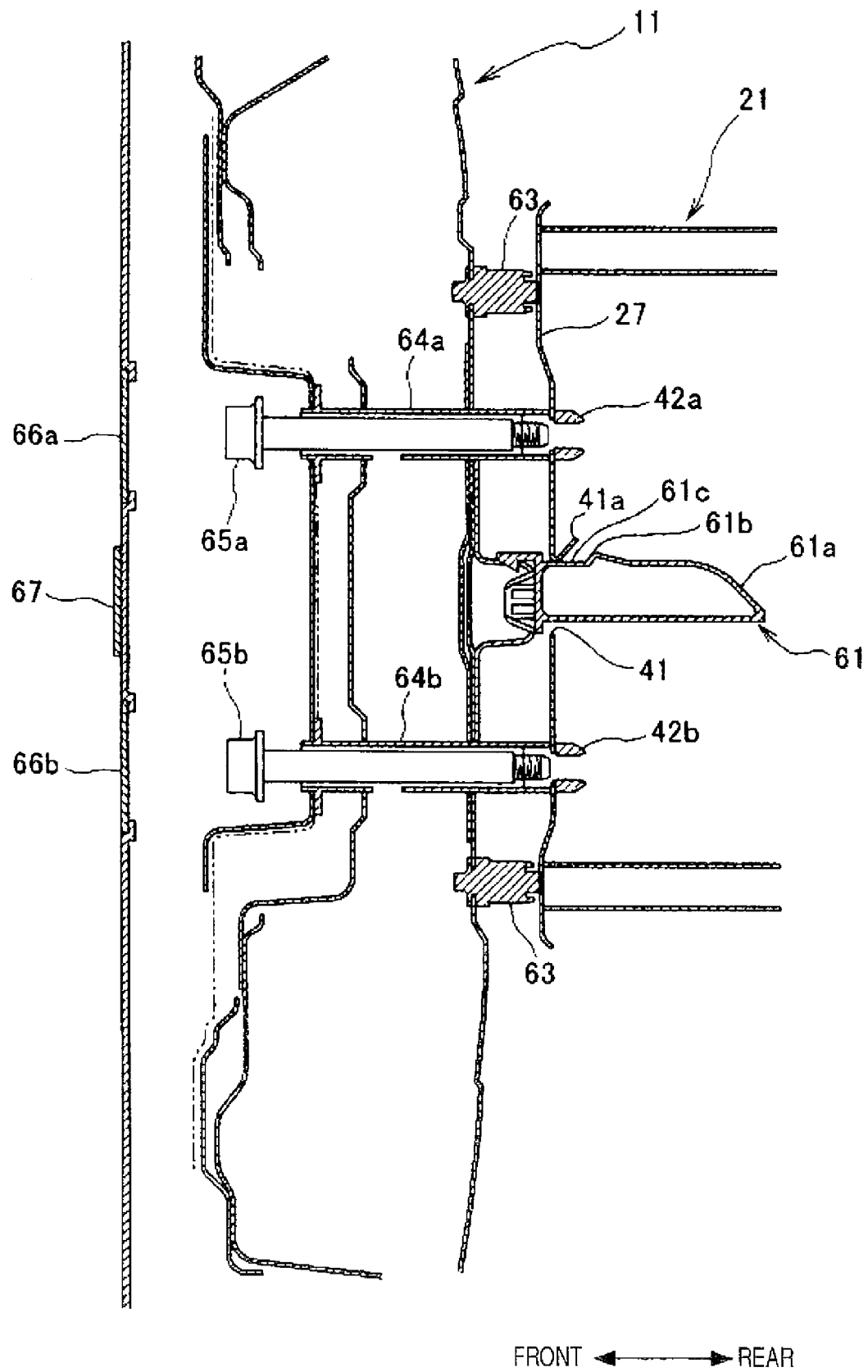
FIG. 10 is a sectional view showing a state in which the engagement portion moves over a planar portion during the closing movement.

Then, as is shown in FIG. 10, when the upper edge portion of the engagement hole 41 moves as far as a proximal end of the planar portion 61c, the mounting plate 27 comes into abutment with the dampers 63 so as to absorb impacts, and in conjunction with this, the nuts 42*a*, 42*b* and the pipes 64*a*, 64*b* are opposed to each other, respectively.

Following this, as is shown in FIG. 6, the bolts 65*a*, 65*b*, which are accommodated in advance in the pipes 64*a*, 64*b*, respectively, are tightened into the nuts 42*a*, 42*b* by employing a wrench or the like which is inserted by opening the lids 66*a*, 66*b*, whereby the spare tire cover supporting body 21 is locked, the spare tire cover 31 being put into a closed state relative to the transverse rear door 11.

On the other hand, when detaching the rotational end of the spare tire cover 31 from the transverse rear door 11, the bolts 65*a*, 65*b* are loosened to be removed from the corresponding nuts 42*a*, 42*b* by employing the wrench or the like, as is shown in FIG. 10, whereby the spare tire cover supporting body 21 is released from the locked state.

Here, as has been described above, since the weights of the spare tire cover 31, the license plate 34 and electrical equipment (for example, a license plate lamp, a rearview monitor, a rear fog lamp and the like) are applied to the spare tire cover supporting body 21 in addition to its own weight, the upper edge of the engagement hole 41 slides over the holder 61 at the same time that the lock is so released, resulting in a fear that the spare tire cover 31 naturally opens. However, even though the rotation of the spare tire cover supporting body 21 in the opening direction occurs, since the bent piece 41*a* of the engagement hole 41 is brought into abutment with the surface of the raised portion 61*c* of the holder 61 which lies facing the proximal end side of the holder 61, as is shown in FIG. 9 the opening movement of the spare tire cover supporting structure 21 is restricted, and the upper edge portion of the engagement hole 41 is temporarily held on the planar portion 61*c* of the holder 61.

Then, when the spare tire cover supporting body 21 is rotated, the upper edge portion of the engagement hole 41 rides over the raised portion 61*a* of the holder 61 to thereby be shifted on to the slope portion 61*a*, as is shown in FIG. 8. Next, as is shown in FIG. 7, the engagement hole 41 descends along the slope portion 61*a* of the holder 61 and, thereafter, moves apart from the holder 61, whereby the spare tire cover 31 is put into an open state relative to the transverse rear door 11.

Note that since the mounting plate 27 side of the spare tire cover supporting body 21 falls when the spare tire cover supporting body 21 rotates, a large load is caused to act on the holder 61 via the engagement hole 41. However, since the holder 61 is supported by the supporting body 57 having the closed cross sectional construction whose rigidity is increased, deformation or failure of the holder 61 is prevented. In addition, since the bent piece 41*a* of the engagement hole 41 is formed to be bent and the curved portion, which is the portion which is so bent, moves over the upper surface of the holder 61, the generation of friction is suppressed, a smooth movement being thereby enabled.

Since the pipes 64*a*, 64*b* are also passed through and supported on the supporting body 57, the deformation or failure of the pipes 64*a*, 64*b* due to hard tightening of the bolts 65*a*, 65*b* are prevented. In addition, since the discharge holes 71*a*, 71*b* are formed in the pipes 64*a*, 64*b*, respectively, even though water such as rain water or washing water intrudes into the pipes 64*a*, 64*b* in such a state that the spare tire cover is kept open, the water that has so intruded is then discharged from the discharge holes 71*a*, 71*b* to the outside of the vehicle.

Since the pipes 64*a*, 64*b* are also passed through and supported on the supporting body 57, the deformation or failure of the pipes 64*a*, 64*b* due to hart tightening of the bolts 65*a*, 65*b* are prevented. In addition, since the discharge holes 71*a*, 71*b* are formed in the pipes 64*a*, 64*b*, respectively, even though water such as rain water or washing water intrudes into the pipes 64*a*, 64*b* in such a state that the spare tire cover is kept open, the water that has so intruded is then discharged from the discharge holes 71*a*, 71*b* to the outside of the vehicle.

By making the relationship between the bent-back angle $\alpha$ and the restricting inclination angle $\beta$ be $\alpha \leq \beta$, the restricting force by the raised portion 61*c* during the opening movement and closing movement of the spare tire cover supporting body 21 is controlled by adjusting the magnitude of the restricting inclination angle $\beta$.

Since the length X over which the bolts 65*a*, 65*b* projects from the distal ends of the pipes 64*a*, 64*b* when the bolts 65*a*, 65*b* are fittingly screwed into the nuts 42*a*, 42*b* and the length Y of the planar portion 61*c* are formed substantially the same, the upper edge of the engagement hole 41 is disposed on the planar portion 61*c* of the holder 61 when the bolts 66*a*, 65*b* are mounted on the nuts 42*a*, 42*b*, respectively, or when the bolts 66*a*, 65*b* are removed from the nuts 42*a*, 42*b*, respectively, whereby the bent piece 41*a* of the engagement hole 41 is made to receive the restricting force by the raised portion 61*b* of the holder 61, and hence, no chance occurs where the spare tire cover supporting body 21 opens on its own by opposing the intention of the worker, thereby making it possible to facilitate one-man work.

Since the graphics of the spare tire 15, the spare tire cover 31, and the bolts 65*a*, 65*b* are indicated on the indicator plate 67, the worker can easily recognize that a spare tire replacement can be done by opening the lids 66*a*, 66*b*.

In addition, in the spare tire cover supporting structure that has been described heretofore, while the configuration is adopted in which the holder 61 is provided on the transverse rear door 11 side, whereas the engagement hole 41 is provided on the spare tire cover supporting body 21 side, the configuration of the invention is not limited thereto. Namely, as is shown in FIG. 11, a configuration may be adopted in which an engagement hole 81 is provided on the transverse rear door 11 side, whereas the holder 61 is provided on the spare tire cover supporting body 21 side.

Figure 11:
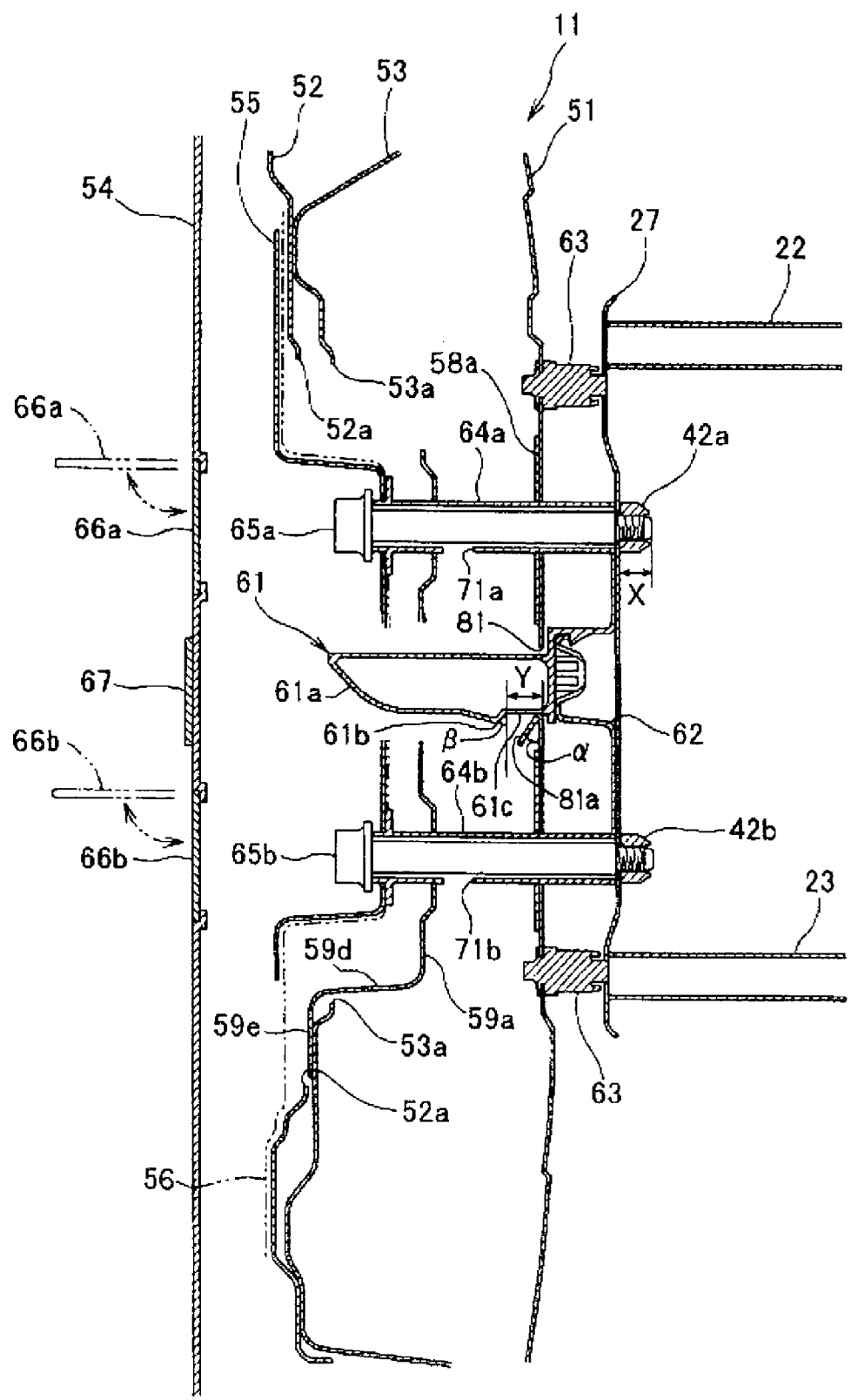
FIG. 11 is a side sectional view of a spare tire supporting structure according to another embodiment of the invention.

As is shown in FIG. 11, the holder 61 is supported on the mounting plate 27 of the spare tire cover supporting body 21 via the bracket 62. As this occurs, the holder 61 is provided in such a way that the slope portion 61*a*, the raised portion 61*b* and the planar portion 61*c* make up the lower surface of the holder 61. On the other hand, the engagement hole 81 is formed in the outer panel 51 of the transverse rear door 11, and a bent piece 81*a* is formed at a lower end of the engagement hole 81 in such a manner as to be bent towards the front of the vehicle.

Here, the bent piece 81*a* of the engagement hole 81 and the outer panel 51 form an angle $\alpha$ therebetween. In addition, a restricting inclination angle formed by an inclined surface of the holder 61 which lies on a proximal side of the raised portion 61*b* and a perpendicular drawn relative to the holder 61 form an angle $\beta$. In addition, a relationship of $\alpha \leq \beta$ is established between the aforesaid bent-back angle $\alpha$ and the restricting inclination angle $\beta$. Consequently, the function and advantage of the invention can also be provided by the configuration like this.

Consequently, according to the spare tire cover supporting structure according to the invention, even though the rotational end side of the spare tire cover supporting body 21 falls due to the weights of the spare tire cover supporting body 21, the spare tire cover 31, the license plate 34, the electrical equipment and the like when the spare tire cover is mounted, since the upper edge portion of the engagement hole 41 is allowed to move along the planar portion 61c from the slope portion 61a of the holder 61, the nuts 42a, 42b on the spare tire cover supporting body 21 side and the pipes 64a, 64b on the transverse rear door 11 side can be made to be disposed coaxially, respectively. In addition, since the shift of the bent piece 41a of the engagement hole 41 in the opening direction can be restricted by the raised portion 61b of the holder 61 and the upper edge portion of the engagement hole 41 can be temporarily held on the planar portion 61c, the tightening of bolts 65a, 65b into the nuts 42a, 42b can be facilitated. As a result, the workability is increased, thereby making it possible to facilitate the mounting of the spare tire cover 31.

On the other hand, when the spare tire cover is removed, even though the rotation of the spare tire cover supporting body 21 in the opening direction occurs due to the weights described above, since the raised portion 61b of the holder 61 can restrict the movement of the bent piece 41a of the engagement hole 41, danger to the surroundings by the natural opening of the spare tire cover 31 can be prevented.

In addition, with the relationship between the bent-back angle α and the restricting inclination angle β made to be $\alpha \leqq \beta$, the restricting force of the raised portion 61b during opening and closing movements of the spare tire cover supporting body 21 can easily be controlled by adjusting the magnitude of the restricting inclination angle β.

In addition, since the length X over which the bolts 65a, 65b projects from the distal ends of the pipes 64a, 64b when the bolts 65a, 65b are fittingly screwed into the nuts 42a, 42b and the length Y of the planar portion 61c are formed substantially the same, the upper edge of the engagement hole 41 is disposed on the planar portion 61c of the holder 61 when the bolts 66a, 65b are mounted on the nuts 42a, 42b, respectively, or when the bolts 66a, 65b are removed from the nuts 42a, 42b, respectively, whereby the restricting force by the raised portion 61b of the holder 61 can be made to act on the bent piece 41a of the engagement hole 41. As a result, no chance occurs where the spare tire cover supporting body 21 opens on its own by opposing the intention of the worker, thereby making it possible to facilitate one-man work.

Additionally, by supporting the holder 61 and the pipes 64a, 64b on the supporting body 57 which is provided in the interior of the transverse rear door 11 and which has the closed cross sectional construction, even though a large load is applied to the holder via the engagement hole 41, the deformation or failure of the holder 61 can be prevented, and the deformation or failure of the pipes 64a, 64b due to the forced tightening of the bolts 65a, 65b thereinto can also be prevented.

Furthermore, the lids 66a, 66b are provided on the door trim 54 which faces the pipes 64a, 64b which accommodate therein the bolts 65a, 65b, respectively, in such a manner as to be opened and closed, and the indicator portion 67 which indicates graphics of the spare tire 15, the spare tire cover 31 and the bolts 65a, 65b is provided in the vicinity of the lids 66a, 66b, thereby making it possible to show easily the worker how to perform spare tire replacement work.

According to the spare tire cover supporting structure according to the invention, the workability in mounting and dismounting the spare tire cover can be increased and danger can be prevented that would otherwise be caused to the periphery because of natural opening or opening by gravity of the spare tire cover.

The invention can be applied to a door which is supported rotatably at one end thereof.

What is claimed is:

1. A spare tire cover supporting structure, comprising:
   a transverse door, provided on a vehicle;
   a spare tire cover, including a first end and a second end, the first end supported on the transverse door, the spare tire cover operable to cover a spare tire held on the transverse door;
   a mounting member attached to the second end of the spare tire cover, the mounting member detachably mounting the second end on the transverse door;
   a supporting member, provided on one of the transverse door and the second end of the spare tire cover;
   an engagement portion, provided on the other of the transverse door and the second end of the spare tire cover, configured to engage with the supporting member, such that when the engagement portion engages the supporting member, the supporting member positions the spare tire cover relative to the transverse door; and
   a lock mechanism that selectively fixes the spare tire cover against the transverse door and releases the spare tire cover from the transverse door,
   wherein the supporting member has a projecting portion that makes contact with the engagement portion when the lock mechanism releases the spare tire cover from the transverse door and the spare tire cover moves in an opening direction by a predetermined amount, such that movement of the spare tire cover in the opening direction is restricted within the predetermined amount.

2. The spare tire cover supporting structure according to claim 1, wherein the transverse door is a transverse rear door.

3. The spare tire cover supporting structure according to claim 1, wherein
   the supporting member includes a guide portion, including a slope for guiding the engagement portion, and
   wherein the projecting portion projects in a first direction which is perpendicular to the opening direction.

4. The spare tire cover supporting structure according to claim 3, wherein
   the engagement portion includes a bent piece which is formed by bending a surface of the other of the transverse door and the second end of the spare tire cover, and the bent piece has a first angle relative to the first direction,
   the projecting portion includes an inclined portion which can be brought into abutment with the bent piece, and the inclined portion has a second angle relative to the first direction, and
   the first angle is smaller than the second angle.

5. The spare tire cover supporting structure according to claim 3, wherein the engagement portion is provided in the mounting member.

6. The spare tire cover supporting structure according to claim 3, wherein the engagement portion is provided in the mounting member and the supporting member is provided in the transverse door.

7. The spare tire cover supporting structure according to claim 3, wherein the supporting member includes a planar portion between the projecting portion and said one of the transverse door and the second end of the spare tire cover from which the supporting member protrudes.

* * * * *